United States Patent Office 2,899,289
Patented Aug. 11, 1959

2,899,289

LIME BUFFING COMPOSITIONS AND METHOD FOR REDUCING SLAKING THEREOF

Le Roy B. High, Detroit, Mich., assignor to The Udylite Research Corporation, Detroit, Mich., a corporation of Michigan No Drawing. Application August 30, 1956
Serial No. 606,967

11 Claims. (Cl. 51—304)

This invention relates to the suppression of the phenomenon of "slaking" of quicklime when it is exposed to a humid atmosphere.

Quicklime, the product obtained by the calcination of various types of limestone and chemically known as calcium oxide, is a very hygroscopic material which absorbs and reacts with the moisture and/or carbon dioxide present in the air under normal atmospheric conditions. This reaction is termed slaking and as stated may be caused by moist air or by the carbon dioxide in comparatively dry air, forming, respectively, calcium hydroxide and calcium carbonate.

To those versed in the field, it is known that the presence of magnesium carbonate in the limestone, forming magnesium oxide on calcination, helps somewhat, compared to pure calcium oxide, to slow the slaking of the quicklime.

In the field of metal finishing, the use of quicklime mixed with a fatty acid, or a derivative thereof (which act as a binder and lubricant) and formed into a useful shape such as a cylindrical rod or stick is in widespread use. It is employed especially for buffing or coloring brass, copper, cadmium, gold, lead, tin, zinc, nickel, etc.

However, a serious drawback to the use of the prepared lime composition is caused by the slaking of the product. In the process of slaking in a humid atmosphere, the calcium oxide is converted to calcium hydroxide which expands and becomes powdery, the bar of compound even becoming brittle and falling apart. This is valueless as a buffing or coloring material for the calcium hydroxide is quite soft and does not have the requisite polishing properties. The embrittlement of the bar also causes a danger to the buffer or polisher for the bar may break when applying the lime to the buffing wheel and cause physical harm to the operator. Also, the powdery product of slaking does not adhere to the wheel and thereby creates a dusty, irritating, and polluted atmosphere at the site of this operation.

It has now been discovered that the slaking of lime buffing compositions and lime coloring compositions can be greatly retarded by modifying conventional compositions of this type to include certain materials in small concentrations of under about 5% by weight. These materials are tertiary amines and are more specifically defined below.

Typical present day lime buffing and coloring formulations used in the field, depending upon whether the user wants a dry product, semi-dry, greasy, or variations thereof, are as follows in parts by weight:

| Long chain (12–20 carbon atoms): | | | | |
|---|---|---|---|---|
| Saturated fatty acid, e.g., Stearic acid | 21 | 15 | 16–18 | 17 |
| Paraffin and/or Petrolatum | 2 | 1 | 6 | 4 |
| Tallow | 3 | 5 | 2–0 | 4 |
| Quicklime | 74 | 78 | 76 | 74 |
| Kerosene | 0 | 0 | 0 | 1 |
| Light Petroleum oil SAE No. 10 | 0 | 1 | 0 | 0 |

The above compositions may be restricted to the saturated fatty acid and quicklime if desired, but for most uses the other specified ingredients, or their equivalents, are desirable in modifying the cutting and coloring characteristics of the lime-buffing composition.

It should be further understood that the proportions given in the above general formulations can be further varied and other minor ingredients including, e.g. rouge, and other long chain saturated fatty acids (unsaturated fatty acids such as oleic acid tend to accelerate the slaking of lime bars and therefore should be kept at a minimum) and derivatives of fatty acids (esters, amides, nitrides, etc.) can be incorporated. In general, however, the quicklime content can vary from about 70% to about 80% (the driest compositions), and stearic acid, the most commonly used fatty acid, can vary from about 10% to about 20% by weight.

The organic materials which have been discovered to greatly retard the slaking of these various lime-bar compositions are exemplified in Table I, and may be classified as tertiary amines consisting of carbon, nitrogen and hydrogen and containing at least five carbon atoms. The preferred tertiary amines are those with nitrogen as part of a ring as in pyridine, hexamethylene tetramine, and picoline.

TABLE I

| | Optimum concentration, percent by weight |
|---|---|
| (1) Pyridine | 1–2 |
| (2) Picolines (methyl pyridines) | 1–2 |
| (3) Hexamethylene tetramine (hexamine, urotropine, formin) | 1–2 |
| (4) Lutidines (dimethyl pyridines) | 1–2 |
| (5) Collidines (trimethyl pyridines) | 1–2 |
| (6) Methyl ethyl pyridine (2-methyl-5 ethyl pyridine) | 1–2 |
| (7) Quinoline | 1–2 |
| (8) Methyl quinolines (quinaldine) | 1–2 |
| (9) Isoquinoline | 1–2 |
| (10) Methyl isoquinolines | 1–2 |
| (11) Dimethyl cyclohexylamine | 1–2 |
| (12) Dimethyl laurylamine | 1–2 |
| (13) Triamyl amine | 1–2 |
| (14) Methyl propyl octadecylamine | 1–2 |
| (15) Tributyl amine | 1–2 |
| (16) Tristearyl amine | 1–2 |
| (17) Tetramethyl ethylene diamine | 1–2 |

The above compounds are satisfactory when used in quantities between about 0.1% and 5% by weight. It is preferred to employ 1% to 2% and about 1.5% has been found to be the best proportion for most purposes.

It has been found that primary and secondary fatty amines have very little effect on retarding the slaking of the lime-bar compositions. This is also true if the primary and secondary fatty amines are converted to tertiary fatty amines by the addition of ethylene oxide or propylene oxide groups, that is, tertiary fatty amines that contain polyoxyethylene or polyoxypropylene groups have very little effect on retarding the slaking of limebars compared with the striking effect of the tertiary amines of this invention, especially the tertiary amine ring compounds.

The relative extent to which the tertiary amine compounds, in concentrations of about 1% to 2% as exemplified by Table I, and especially the tertiary amine ring compounds such as pyridine, hexamethylene tetramine, picoline, retard the slaking of the lime-bars or lime-sticks of compositions illustrated in Examples I through IV compared to lime-bars of identical composition except for the retardant additives of this invention, is shown by the following comparison tests. In exposure in a hot and humid laboratory room with uncovered lime-bars, the bars that contained the slaking retardant additive were still in usable condition at the end of two weeks exposure, whereas the controls without retardant additive were unusable at the end of three days. Using covered lime-bars open only at the top, the bars with the retardant additive were still usable at the end of three months exposure in the laboratory during the summer time whereas the control bars without retardant additive were unusable at the end of three weeks. In accelerated tests using a humidity cabinet at temperatures averaging between 75°–80° F. and relative humidities of 95% to about 100%, the uncovered lime-bars containing the retardant additive were still usable at the end of three days, whereas the control bars were unusable at the end of one day.

Examples of a number of typical compositions of this invention are set forth below.

*Example I*

| | Parts by weight |
|---|---|
| Stearic acid | 13 |
| Paraffin and/or petrolatum | 1 |
| Tallow | 5 |
| Quicklime | 78 |
| Light petroleum oil (SAE No. 10) | 1 |
| Pyridine | 2 |

*Example II*

| | |
|---|---|
| Stearic acid | 20–23 |
| Petrolatum | 2 |
| Tallow | 3–0 |
| Quicklime | 74 |
| Hexamethylene tetramine | 1 |

*Example III*

| | |
|---|---|
| Stearic acid | 15–17 |
| Paraffin and/or petrolatum | 6 |
| Tallow | 2–0 |
| Quicklime | 76 |
| Picoline | 1 |

*Example IV*

| | |
|---|---|
| Stearic acid | 15 |
| Paraffin and/or petrolatum | 4 |
| Tallow | 4 |
| Quicklime | 74 |
| Kerosene | 1 |
| Lutidine | 2 |

Although these retardant additives do not completely prevent the slaking of quicklime, they greatly decrease the rate of slaking, and do have beneficial effects in other ways. When a lime bar without retardant additive slakes, it expands and becomes powdery and brittle as mentioned before. With the presence of the retardant additive the swelling of the lime stick is negligible, or occurs to only a comparatively small degree and the tendency for the formation of a powdery condition and a brittle bar is consequently greatly reduced. These are the most important results as already explained. Furthermore, there is a tendency to reduce the pour point of the warm mixture which is of aid in pouring the composition into stick or bar form. In this latter respect, the pyridine and the substituted pyridines such as the picolines are especially effective.

Mixtures of the compounds of Table I may be used, such as, 1.4% hexamethylene tetramine and 0.2% pyridine, or 1.2% hexamethylene tetramine and 0.2% picoline or 0.3% lutidine. Also, it is preferred to use the compounds that are the least volatile and have the least odor, such as hexamethylene tetramine in concentration of 1%, 1.5% or about 2%, which are optimum concentrations.

The incorporation of a minor percent of an aromatic aldehyde, e.g. cinnamic aldehyde, benzaldehyde, and substituted benzaldehydes consisting of carbon, hydrogen and oxygen atoms such as anisaldehyde, heliotropin, vanillin, etc. or a saturated fatty aldehyde having 8–18 carbon atoms such as octyl aldehyde, lauryl aldehyde or stearyl aldehyde also improves the pour point, that is, depresses the pour point of the warmed mixture, and also imparts a pleasant odor to the lime-bar. Moreover, these aldehydes also act as slaking retardant additives when used alone and also function in combination with the slaking retardant additives of Table I. In general, of these aldehydes, the aromatic aldehydes are preferred, and the preferred concentrations are from about 0.1% to about 3% by weight of the lime composition. Benzaldehyde, for example, is useful in concentrations between about 0.1% and about 1.5% of the lime composition, and cinnamic aldehyde is preferably employed in concentrations of about 0.1% to about 0.5%. The best anti-slaking results are obtained with the compounds having nitrogen in the ring when used alone or in combinations, and the difference is substantial and the superiority is commercially important.

What is claimed is:

1. An improved composition comprising about 70% to about 80% lime, about 10% to about 20% long chain saturated fatty acid and up to about 5% of at least one tertiary amine consisting of carbon, nitrogen and hydrogen and containing at least five carbon atoms.

2. An improved composition comprising about 70% to about 80% lime, about 10% to about 20% long chain saturated fatty acid and about 0.1% to about 5% of at least one tertiary amine consisting of carbon, nitrogen and hydrogen and containing at least five carbon atoms.

3. An improved buffing composition comprising in weight percent about 70% to about 80% lime, about 10% to about 20% long chain saturated fatty acid, about 1% to about 6% petrolatum, about 2% to about 5% tallow and about 0.1% to about 5% of at least one tertiary amine consisting of carbon, nitrogen and hydrogen and containing at least five carbon atoms.

4. A composition in accordance with claim 1 wherein said fatty acid is stearic acid.

5. A composition in accordance with claim 1 wherein the nitrogen in said amine is a part of a ring.

6. A composition in accordance with claim 1 wherein said tertiary amine is hexamethylene tetramine.

7. A composition in accordance with claim 3 wherein the nitrogen in said amine is a part of a ring.

8. A composition in accordance with claim 3 wherein said tertiary amine is hexamethylene tetramine.

9. A composition in accordance with claim 1 wherein the said tertiary amine is present in an amount of about 1% to about 2%.

10. An improved lime buffing composition comprising in weight percent about 70% to about 80% lime, about 10% to about 20% stearic acid, about 0.1% to about 5% of at least one tertiary amine consisting of carbon, nitrogen and hydrogen atoms and containing at least 5 carbon atoms, and about 0.1 to about 3% of an aldehyde selected from the group consisting of benzaldehyde and substituted benzaldehydes consisting of carbon, hydrogen and oxygen atoms, and saturated fatty aldehydes having 8 to 18 carbon atoms.

11. A method for decreasing the slaking of lime buffing compositions comprising about 70% to about 80% lime, about 10% to about 20% long chain saturated fatty acid which comprises the step of admixing with said lime and fatty acid about 0.1 to about 5% by weight of at least one tertiary amine consisting of carbon, nitrogen and hydrogen and containing at least five carbon atoms.

References Cited in the file of this patent

UNITED STATES PATENTS

| | | |
|---|---|---|
| 1,743,865 | Pilgrim | Jan. 14, 1930 |
| 2,078,876 | Hennessey | Apr. 27, 1937 |
| 2,119,159 | Glenning | May 31, 1938 |
| 2,307,232 | Oglesby | Jan. 5, 1943 |
| 2,482,667 | Gray | Sept. 20, 1949 |
| 2,540,003 | McCoy | Jan. 30, 1951 |
| 2,606,829 | Chester | Aug. 12, 1952 |
| 2,642,348 | Stier | June 16, 1953 |